(No Model.)
C. H. BILL.
SCUFFLE HOE.
No. 404,156. Patented May 28, 1889.
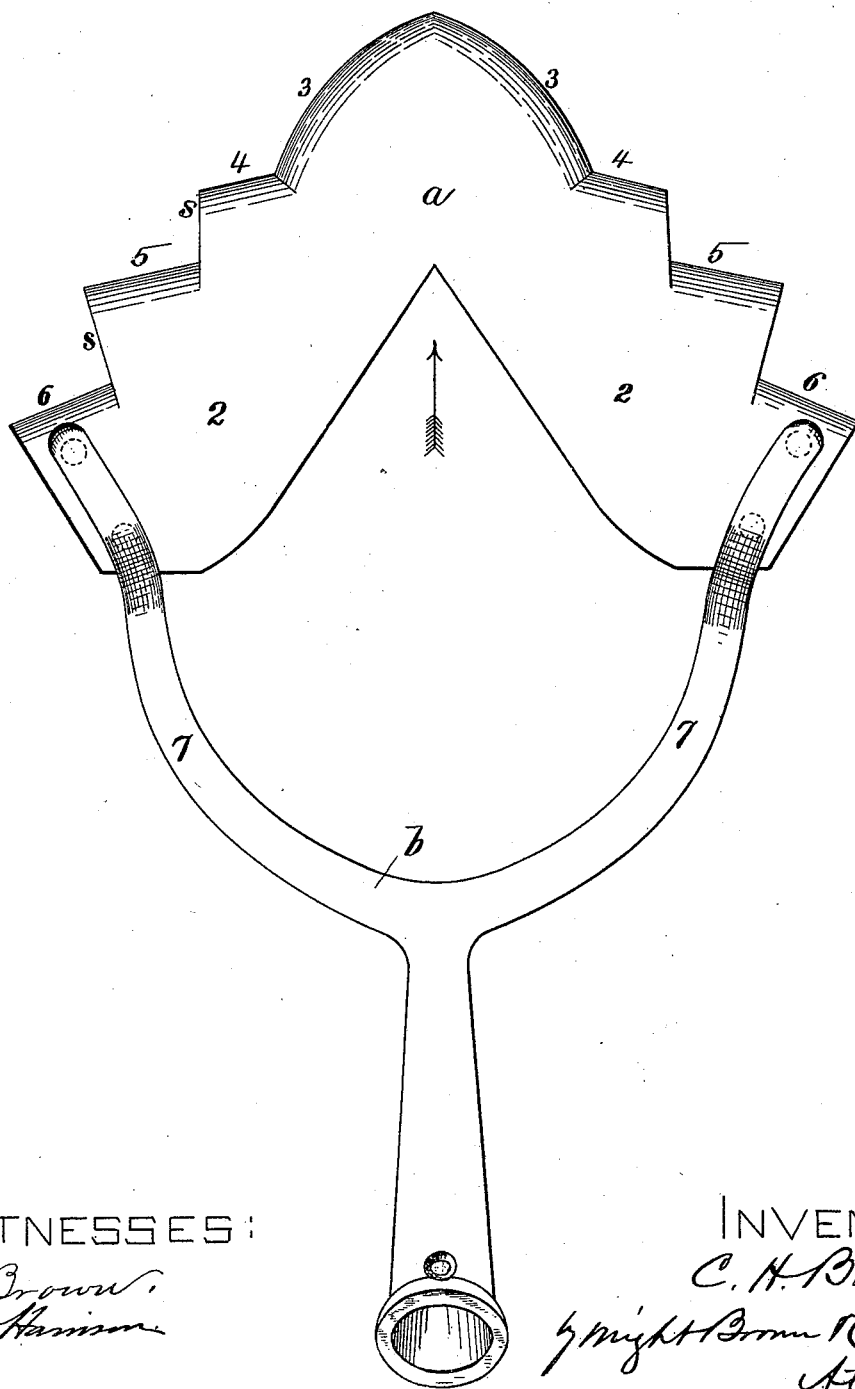

UNITED STATES PATENT OFFICE.

CHARLES H. BILL, OF WALTHAM, MASSACHUSETTS.

SCUFFLE-HOE.

SPECIFICATION forming part of Letters Patent No. 404,156, dated May 28, 1889.

Application filed February 11, 1889. Serial No. 299,400. (No model.)

*To all whom it may concern:*

Be it known that I, CHARLES H. BILL, of Waltham, in the county of Middlesex and State of Massachusetts, have invented certain new and useful Improvements in Scuffle-Hoes, of which the following is a specification.

This invention relates to hoes or implements for cutting weeds below the surface of a gravel walk or roadway, or wherever it is desirable to kill vegetable growth without materially disturbing or changing the contour of the surface.

The invention consists in a hoe having the peculiarities of form which I will now proceed to describe and claim.

The accompanying drawing, forming a part of this specification, represents a top view of my improved hoe.

The same letters and figures of reference indicate the same parts.

In the drawing, *a* represents the blade of my improved hoe, which is composed of two sides or wings, 2 2, formed in one piece and arranged to give the blade a V shape, the apex being at the front. The outer edges of the wings 2 2 are provided with cutting-edges 3 4 5 6. The edges 3 3 are curved and extend from the apex of the blade backwardly and outwardly to the edges 4, the latter being continuations of the edges 3. The edges 4, 5, and 6 incline outwardly and backwardly, and terminate at their outer ends in shoulders *s*.

It will be seen that by the described backward and outward inclination of the blades the inner end of each blade is in advance of the outer end, each edge being thereby so inclined that when the hoe is moved forward in the direction of the arrow the roots, &c., which accumulate on the blades will have a tendency to slide along said blades from the inner to the outer ends thereof. The hoe therefore clears itself of obstructions of the kinds specified, and operates more effectively in cutting weeds and other vegetation below the surface than it could do if its blades were inclined in the opposite direction, so that their outer ends would be in advance of their inner ends, in which case there would be a tendency on the part of each blade to accumulate weeds, &c., on its edge, thus obstructing the hoe and making its action imperfect. The cutting-edges are arranged at suitable angles to enable them to cut with certainty and effectiveness. The blade is provided with a bifurcated shank, *b*, the branches 7 7 of which are riveted to the rear ends of the wings 2 2.

I claim—

A scuffle-hoe composed of the wings 2 2, arranged as shown, and having the blades 3 4 5 6 on their outer edges, said blades having their cutting-edges extended outwardly and inclined backwardly, as set forth.

In testimony whereof I have signed my name to this specification, in the presence of two subscribing witnesses, this 4th day of February, A. D. 1889.

CHARLES H. BILL.

Witnesses:
C. F. BROWN,
A. D. HARRISON.